United States Patent
MacDonald et al.

(10) Patent No.: US 7,580,767 B2
(45) Date of Patent: Aug. 25, 2009

(54) METHODS OF AND APPARATUSES FOR MAINTENANCE, DIAGNOSIS, AND OPTIMIZATION OF PROCESSES

(75) Inventors: Paul Douglas MacDonald, Tracy, CA (US); Michiel V. P. Krüger, Berkeley, CA (US); Michael Welch, Livermore, CA (US); Mason L. Freed, Pleasant Hill, CA (US); Costas J. Spanos, Lafayette, CA (US)

(73) Assignee: KLA-Tencor Corporation, San Jose, CA (US)

( * ) Notice: Subject to any disclaimer, the term of this patent is extended or adjusted under 35 U.S.C. 154(b) by 344 days.

(21) Appl. No.: 11/179,440

(22) Filed: Jul. 11, 2005

(65) Prior Publication Data
US 2007/0055403 A1  Mar. 8, 2007

Related U.S. Application Data

(60) Provisional application No. 60/586,892, filed on Jul. 10, 2004.

(51) Int. Cl.
G06F 19/00 (2006.01)
(52) U.S. Cl. .................... 700/108; 702/182
(58) Field of Classification Search .......... 700/108–110, 700/121, 117; 702/182–184
See application file for complete search history.

(56) References Cited

U.S. PATENT DOCUMENTS

| | | | |
|---|---|---|---|
| 5,444,637 A | 8/1995 | Smesny et al. | 702/127 |
| 5,526,293 A | 6/1996 | Mozumder et al. | 716/19 |
| 5,635,409 A | 6/1997 | Moslehi | 438/7 |
| 5,907,820 A | 5/1999 | Pan | 702/155 |
| 5,967,661 A | 10/1999 | Renken et al. | 374/126 |
| 5,969,639 A | 10/1999 | Lauf et al. | 340/870.17 |
| 6,033,922 A | 3/2000 | Rowland et al. | 438/14 |
| 6,244,121 B1 | 6/2001 | Hunter | 73/865.9 |
| 6,285,971 B1* | 9/2001 | Shah et al. | 703/2 |
| 6,445,969 B1 | 9/2002 | Kenney et al. | 700/108 |
| 6,460,002 B1 | 10/2002 | Bone et al. | 702/81 |
| 6,512,985 B1 | 1/2003 | Whitefield | 702/81 |
| 6,535,774 B1 | 3/2003 | Bode et al. | |
| 6,542,835 B2 | 4/2003 | Mundt | 702/65 |
| 6,562,185 B2 | 5/2003 | Avanzino et al. | 156/345.13 |
| 6,642,853 B2 | 11/2003 | Hunter | 340/870.16 |
| 6,643,596 B2 | 11/2003 | Firth et al. | 702/84 |
| 6,675,137 B1 | 1/2004 | Toprac | 703/2 |

(Continued)

OTHER PUBLICATIONS

U.S. Appl. No. 60/586,892, filed Jul. 10, 2004, Inventor(s) Paul Douglas MacDonald, Michiel Krüger, Michael Welch.

(Continued)

*Primary Examiner*—Kidest Bahta
(74) *Attorney, Agent, or Firm*—Joshua D. Isenberg; JDI Patent

(57) ABSTRACT

One aspect of the present invention is a method of monitoring processes, optimizing processes, and diagnosing problems in the performance of a process tool for processing a workpiece. Another aspect of the present invention is a system configured for monitoring processes, optimizing processes, and diagnosing problems in the performance of a process tool for processing a workpiece. One embodiment of the present invention includes a software program that can be implemented in a computer for optimizing the performance of a process tool for processing a workpiece.

21 Claims, 11 Drawing Sheets

U.S. PATENT DOCUMENTS

| | | | |
|---|---|---|---|
| 6,691,068 B1 | 2/2004 | Freed et al. | 702/187 |
| 6,698,009 B1 | 2/2004 | Pasadyn et al. | 716/19 |
| 6,714,884 B2 | 3/2004 | Dor et al. | 702/82 |
| 6,718,224 B2 | 4/2004 | Firth et al. | 700/121 |
| 6,748,280 B1 | 6/2004 | Zou et al. | 700/31 |
| 6,766,214 B1 | 7/2004 | Wang et al. | 700/121 |
| 6,766,283 B1 | 7/2004 | Goldman et al. | 703/2 |
| 6,772,035 B2 | 8/2004 | Mouli | 700/121 |
| 6,789,052 B1 | 9/2004 | Toprac | 703/2 |
| 6,907,364 B2 | 6/2005 | Poolla et al. | 702/65 |
| 6,957,201 B2 | 10/2005 | Alhadef et al. | |
| 7,050,950 B2* | 5/2006 | Goebel | 703/2 |
| 7,079,023 B2* | 7/2006 | Haller | 340/522 |
| 7,151,366 B2* | 12/2006 | Renken et al. | 324/158.1 |
| 7,171,334 B2* | 1/2007 | Gassner | 702/182 |
| 7,192,505 B2* | 3/2007 | Roche et al. | 156/345.28 |
| 7,331,250 B2* | 2/2008 | Hunter | 73/865.9 |
| 2002/0049704 A1 | 4/2002 | Vanderveldt et al. | |
| 2002/0177916 A1 | 11/2002 | Poolla et al. | 700/108 |
| 2002/0177917 A1 | 11/2002 | Polla et al. | 700/108 |
| 2003/0018928 A1 | 1/2003 | James et al. | 714/25 |
| 2004/0015460 A1 | 1/2004 | Alhadef et al. | |
| 2004/0122636 A1* | 6/2004 | Adam | 703/2 |
| 2004/0249604 A1 | 12/2004 | Poolla et al. | |
| 2005/0060336 A1 | 3/2005 | Abercrombie et al. | |
| 2005/0071034 A1* | 3/2005 | Mitrovic | 700/121 |
| 2005/0071035 A1* | 3/2005 | Strang | 700/121 |
| 2005/0071036 A1* | 3/2005 | Mitrovic | 700/121 |
| 2005/0119850 A1 | 6/2005 | Asano | |

OTHER PUBLICATIONS

Kim et al., "AIM: Approximate Intelligent Matching for Time Series Data," 2000 International Conference on Data Warehouse and Knowledge Discovery (DaWaK'00), Greenwich, U.K., Sep. 2000 (http://www-sal.cs.uiuc.edu/~hanj/pdf/dawak00.pdf).

International Search Report and Written Opinion for International Application No. PCT/US05/24580, mailed Dec. 28, 2006.

PCT International Preliminary Examination Report and Annexes for International Application PCT/US01/26315 (Analogous to U.S. Appl. No. 09/643,614). Repost completed May 23, 2003.

Office Action for U.S. Appl. No. 10/673,049 mailed Feb. 22, 2005.

Office Notification dated Jun. 04, 2009 for Taiwanese Patent Application No. 094123180.

* cited by examiner

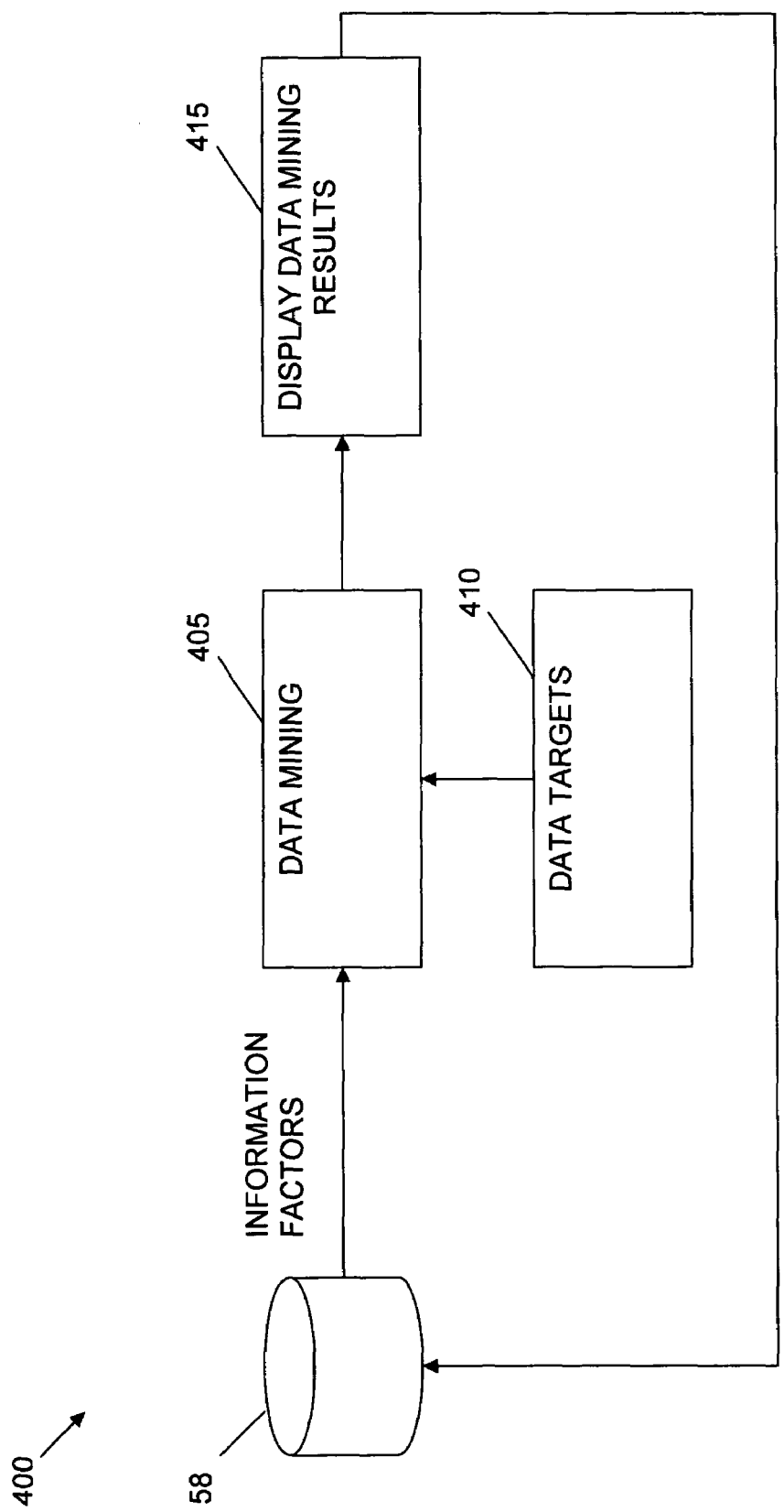

METHODS OF AND APPARATUSES FOR MAINTENANCE, DIAGNOSIS, AND OPTIMIZATION OF PROCESSES

CROSS-REFERENCES

The present application claims benefit of U.S. Patent application No. 60/586,892, filed Jul. 10, 2004. The present application is related to U.S. patent application Ser. No. 10/673,049 filed on 26 Sep. 2003; U.S. Patent Application No. 60/469,377 filed on 8 May 2003; and U.S. Pat. No. 6,691,068, filed on 22 Aug. 2000. All of these applications and patent are incorporated herein, in their entirety, by this reference.

BACKGROUND

In modern manufacturing facilities for processing workpieces such as semiconductor wafers, flatpanel display substrates, and lithography masks, with a lack of in-situ workpiece measurements, critical chamber components for workpiece processing tools must be closely monitored during processing. Typically, each of these components is regularly scheduled for preventive maintenance with the goal of within-specification performance.

For the application of manufacturing semiconductor devices from semiconductor wafers, critical dimensions (CDs) and wafer yields are frequently measured during regular tool operation; any deviations are carefully analyzed by experienced fab personnel to identify faulty process chamber components. This troubleshooting process is time, labor, and material intensive.

Plasma environments can be extremely harsh on sensitive metrology equipment. The combination of high radio frequency (RF) powers and corrosive chemistries attack any materials placed into these environments. This is widely demonstrated by the normal consumption of in-chamber materials, deemed "consumables" for this reason. Nevertheless, as the semiconductor industry calls for smaller critical dimensions, tighter plasma process control solutions are required—in-situ plasma monitoring now becomes a necessity. In particular, extreme applications such as high aspect ratio dielectric applications and sub-90 nm polysilicon gates require the ability to accurately measure small signals related to the etching process despite the noise inherent in this environment.

The performance of etch processes during semiconductor manufacturing is strongly affected by various interacting mechanisms including chemical reactions, reactive ion etching, thin film deposition, and mask erosion. All of these processes are very sensitive to temperature, allowing temperature to be used as a tool for the detection of many issues within the plasma chamber and on the wafer. In particular, within-wafer and run-to-run variations in temperature can often be directly linked to failures in critical etch chamber components such as the electrostatic chuck (ESC), radio-frequency generators, and mass-flow controllers. Measurement of the thermal profile at the surface of the wafer provides information about the reactions on the wafer's surface (i.e. the process zone).

There is a need for improved methods and apparatus for monitoring, optimizing, detecting failures, and/or assessing the operating performance of components and sub-components of process tools for processing workpieces. Examples of applications that are of particular importance are applications such processing semiconductor wafers, processing flat panel displays, and processing lithography masks. There is also a need for methods and apparatuses suitable for characterizing processes and process tools.

SUMMARY

One aspect of the present invention is a method of monitoring processes, optimizing processes, and diagnosing problems in the performance of a process tool for processing a workpiece. Another aspect of the present invention is a system configured for monitoring processes, optimizing processes, and diagnosing problems in the performance of a process tool for processing a workpiece. One embodiment of the present invention includes a software program that can be implemented in a computer for optimizing the performance of a process tool for processing a workpiece. Another embodiment of the present invention includes a software program that can be implemented in a computer for diagnosing problems in the performance of a process tool for processing a workpiece. Another embodiment of the present invention includes a software program that can be implemented in a computer for assessing the performance of a process tool for processing a workpiece.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

BRIEF DESCRIPTION OF FIGURES

FIG. 9. A flow diagram according to an embodiment of the present invention.

DESCRIPTION

The present invention now will be described more fully hereinafter with reference to the accompanying figures in which preferred embodiments and/or results of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For illustrative purposes, the various apparatus, methods, and computer program products of the present invention are illustrated and described below, primarily in conjunction with processes and apparatuses such as those used for substrates for manufacturing semiconductor devices. It should be apparent, however, that the apparatuses, methods, and computer program products of the present invention could be used with many different types of equipment and processes for processing workpieces. For instance, the apparatus, methods, and computer program products may be used for processes such as plasma deposition processes, plasma annealing processes, plasma ashing processes, sputtering process, sputter deposition processes, chemical vapor deposition processes, annealing processes, post exposure bake processes, chemical mechanical planarization processes, substrate polishing processes, and other processes used for manufacturing products such as electronic devices, optical devices, flat panel displays, and lithography masks.

Furthermore, while a preferred embodiment of the present invention has been used to manipulate temperature profiles (that is, temperature data as a function of position and time), it is to be understood that embodiments of the present invention are not to be limited to temperature profiles. In view of the following teachings, it will be clear to one of ordinary skill in the art that an extension of the techniques taught herein result in additional embodiments of the present invention that incorporate the manipulation of variables other than, or in addition to, temperature, or even the combination of many different variables. For example, embodiments of the present invention for processing a substrate with a glow discharge plasma may include variables such as plasma potential, ion energy, ion density, temperature, pressure, optical radiation, charge, ion flux, heat flux, etch rate, and heat flux. For another example, embodiments of the present invention for processing a substrate with chemical mechanical planarization may include variables such as pressure, pressure distribution, temperature, temperature distribution, and rotation speed. These lists are not exhaustive and are provided to show mere examples.

Figure 1A:
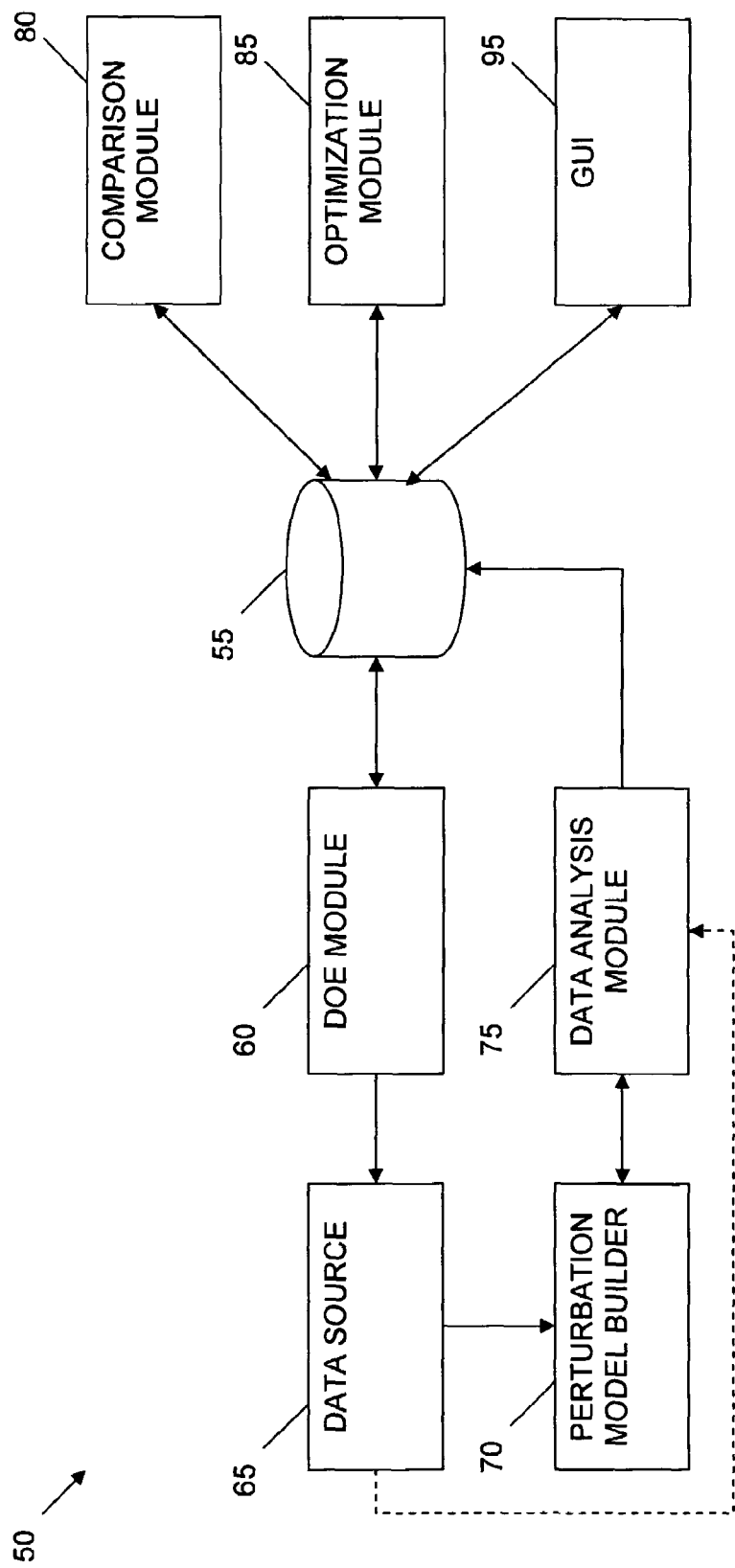
FIG. 1A. A block diagram of a system according to an embodiment the present invention.

Reference is now made to FIG. 1A where there is shown a system 50 according to one embodiment of the present invention. System 50 is configured for at least one of process monitoring, process optimization, fault detection, and fault identification for one or more process tools and processes for processing workpieces. System 50, as shown in FIG. 1A, represents a preferred embodiment of the present invention. It is to be understood that all of the components shown in FIG. 1A are not necessary for other embodiments of the present invention.

System 50 shown in FIG. 1A includes a memory 55 such as a computer information storage memory capable of storing information in a data structure such as an information database for preferred embodiments of the present invention. Is to be understood that embodiments of the present invention are not limited to the use of an information database. Optionally, the information can be stored in data structures such as one or more lists, arrays, tables, relational databases, hierarchical databases, and other data structures known to a person of ordinary skill in the art.

System 50 also includes a design of experiments module 60, a data source 65, a perturbation model builder 70, and a data analysis module 75. Design of experiments module 60 is configured for generating a design of experiments for characterizing the processes and process tools. Design of experiments module 60 is connected with memory 55 for retrieving information for preparing the design of experiments and for storing the design of experiments in memory 55. Data source 65 is configured for providing process data obtained for the design of experiments. In one embodiment, these components are interconnected substantially as shown in FIG. 1A. More specifically, design of experiments module 60 is connected with memory 55 so as to allow information transfer therebetween. Examples of the types of information obtained from memory 55 for the design of experiments are process recipes, process condition ranges, and process tool identification information. Optionally, the experimental design details can be stored in memory 55.

The design of experiments obtained from module 60 provides process setting for operating a selected process tool. During the execution of the design of experiments, the process parameter measurements are collected into data source 65. For preferred embodiments of the present invention, data source 65 comprises a data collection system capable of measuring process parameters experienced by a workpiece used for the process. A preferred data collection system is a substantially autonomous sensor apparatus comprising a base configured so as to have properties that mimic the workpiece, a plurality of sensors supported by the base, an information processor connected with the sensors for receiving signals from the sensors. The information processor is configured for data communication with memory 55. Preferably, the sensor apparatus also has data-storage capabilities. The sensor apparatus is configured for measuring process parameters substantially equivalent to those experienced by the workpiece. A detailed description of the sensor apparatus can be found in U.S. Pat. Ser. No. 6,691,068.

In an alternative embodiment, data source 65 includes one or more sensors incorporated in the process tool so as to measure process parameter data. It is common to use sensors in this way for manufacturing processes. For such an embodiment, data source 65 is configured so that the process parameter data can be transferred to memory 55.

Another embodiment of the present invention comprises having data source 65 configured as part of memory 55. In other words, data source 65 comprises data that has been stored in memory 55. Optionally, data stored on memory 55 that comprises data source 65 may be obtained from a sensor apparatus as described above, from one or more sensors incorporated in the process tool as described above, or from some other methods and apparatus.

The parameter measurements from data source 65 are provided to perturbation model builder 70 which uses the parameter data to build the perturbation model. Data from data source 65 is preferably spatially resolved data, temporally resolved data, or combinations of the two. As an option, parameter measurements from data source 65 may be applied to data analysis module 75 for initial processing of the data. Examples of initial data processing include processes such as validating and screening data so that only the data of importance is used for further processing. The validated and screened data may then be used for building the perturbation model in module 70. Alternatively, results generated with the perturbation model, which may also include responsivities, are applied to data analysis module 75 for validation and screening of the results from the perturbation model. In other words, perturbation model builder 70 may be connected with data source 65 directly, or perturbation model builder may be indirectly connected with data source 65 via data analysis module 75. Optionally, data analysis module 75 may be configured so as to analyze data directly from data source 65 or interactively connected with the perturbation model 70. Clearly, there are numerous configurations for embodiments of the present invention. In view of the present disclosure, other embodiments of the present invention will be clear to a person of ordinary skill in the art.

Perturbation model builder 70 is configured so as to provide a perturbation model representing the performance of the processes and process tools. For preferred embodiments, output from the perturbation model is formed into responsivities that include effect maps of each critical process variable. For the purpose of this disclosure, the term responsivities is defined to mean the magnitude and shape of conditions, or results produced by specified process settings of control parameters and process tool configuration. In further embodiments, the uniformity and magnitude of each effect are determined and made available for display and review. For preferred embodiments, the design of experiments, the parameter measurements, the perturbation model, the responsivities generated using the perturbation model, are stored in memory 55 as part of the information database stored in memory 55.

The information database stored in memory 55 relates the information from design experiments module 60, data source 65, perturbation model builder 70, data analysis module 75, with process recipes and process tool information. As an option, a body of data for the information database can be accumulated for a plurality of tools, or a plurality of processes or both. As another option, the body of data may include information collected over a period of time for applications such as applications showing trends, statistical process control, and historical tool performance. Alternatively, the body of data may include data for preferred processes such as what may be referred to in the industry as "Golden" processes and such as optimized processes. The body of data may include data for known failures so as to provide characterizations of the failure for failure identification and diagnosis.

As an option, system 50 shown in FIG. 1A may include at least one of a comparison module 80, an optimization module 85, and a graphical user interface 95. The most preferred embodiment of the present invention includes all of the elements shown in FIG. 1A.

Comparison module 80 is connected with memory 55 so as to have access to the database. Comparison module 80 is configured for performing comparisons of corresponding types of data saved in the database. The comparisons may be made with data stored in the database or data may be provided from a source other than the database for comparison. In preferred embodiments, the comparisons include using responsivities from the perturbation model. In a more preferred embodiment, the comparisons are made between one or more information factors for two more sets of data.

For one embodiment of the present invention, the comparison module is figured for making the comparisons so as to identify whether the processes and process tools are operating within predetermined specifications. For another embodiment of the present invention, the comparison module is configured for comparing information stored so as to identify a fault for at least one of the processes and the process tools.

Optimization module 85 is connected with memory 55 so as to have access to the database. Optimization module 85 is configured for performing optimizations for process settings, process parameters, or combinations thereof. The optimization is based on differences between one or more sets of data stored in the database. Optionally, the optimization may be based on differences between sets of data stored in the database and sets of data from other than the database data. As an option, the optimization may be performed on either process parameter measurements, the perturbation model, perturbation model results such as responsivities obtained from the perturbation model, information factors, or combinations thereof. In preferred embodiments, the optimization process includes using responsivities from the perturbation model. In a more preferred embodiment, the optimization process includes using information factors. For one embodiment of the present invention, the optimization module is configured for adjusting at least one control parameter for at least one of the processes and the process tools as a function of predetermined optimization criteria and comparisons of information in the memory.

Graphical user interface 95 is connected with memory 55 so as to have access to the database. Interface 95 is configured so as to allow graphical viewing and analysis of data in the database. Interface 95 also provides a user with access to information in the database for retrieving information and inputting information as needed.

In one embodiment of the present invention, memory 55 is connected with a computer or a computer network for executing computer programs. Also, design of experiments module 60 comprises a computer program, data analysis module 75 comprises a computer program, perturbation model builder 70 comprises a computer program, comparison module 80 comprises a computer program, and optimization module 85 comprises a computer program. The computer programs are arranged so that they can be executed on the computer or computer network. In another embodiment of the present invention, design of experiments module 60, data analysis module 75, perturbation model builder 70, comparison module 80, and optimization module 85 comprise computer programs encoded onto a computer readable media.

In view of the present disclosure, a person of ordinary skill in the art will understand that a wide variety of configurations can be used for systems according to embodiments of the present invention. The elements described for the embodiment shown in FIG. 1A provide only one example embodiment. Another example embodiment is shown in FIG. 1B.

Figure 1B:
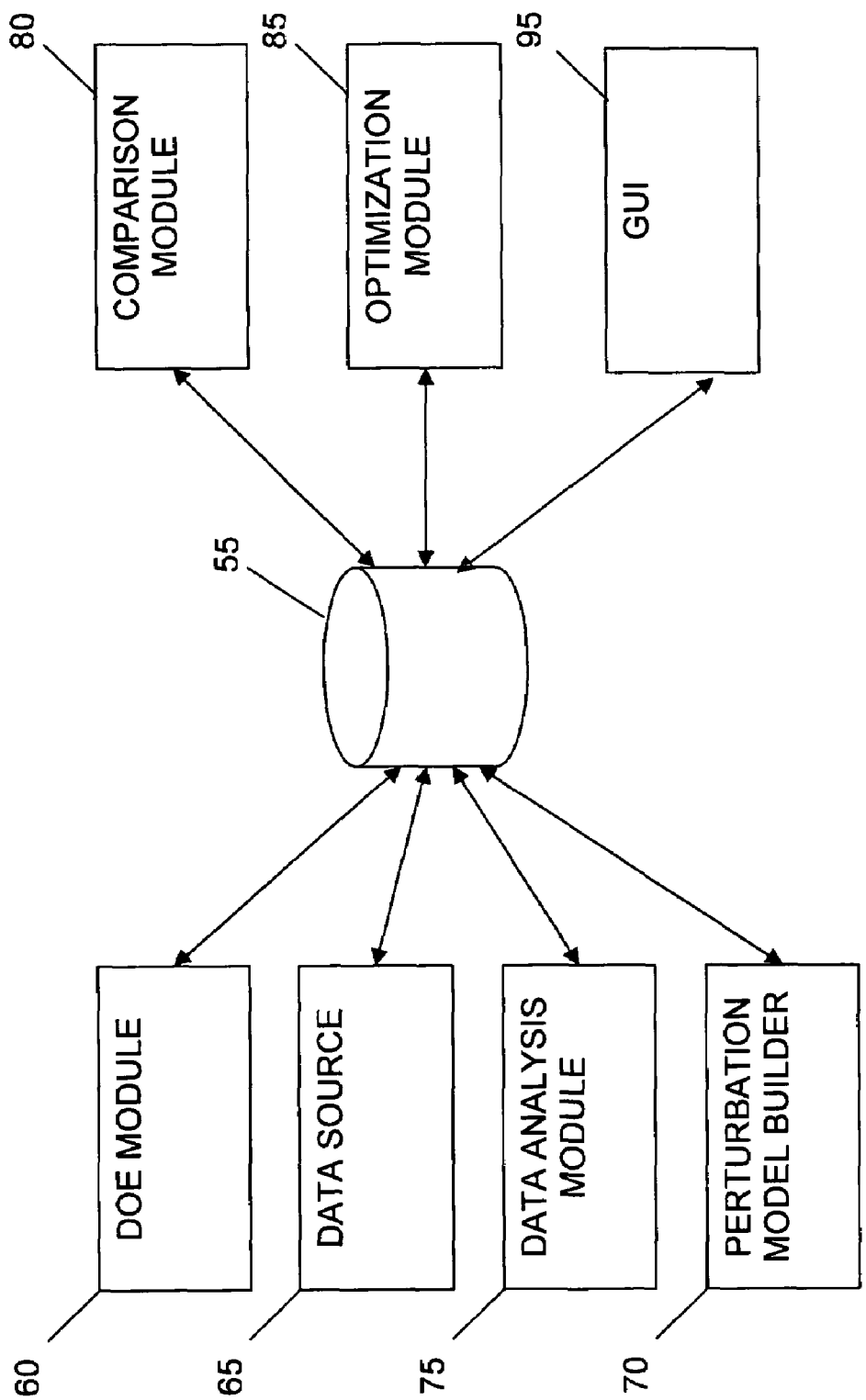
FIG. 1B. A block diagram of a system according to an embodiment the present invention.

The embodiment shown in FIG. 1B is essentially the same as that described for the embodiment shown in FIG. 1A with respect to the elements included in the embodiment. More specifically, the embodiment shown in FIG. 1B includes memory—55 configured for storing an information database, a design of experiments module 60, a data source 65, a data analysis module 75, and a perturbation model builder 70. The embodiment shown in FIG. 1B is configured so that memory 55 is directly accessible to design of experiments module 60, data source 65, data analysis module 75, and perturbation model builder 70. In this arrangement, memory 55 acts as a central point for information access and exchange. The embodiment shown in FIG. 1B further includes optional elements as described for the embodiment shown in FIG. 1A. The optional elements shown in FIG. 1B are a comparison module 80, an optimization module 85, and a graphical user interface 95. The optional modules are connected with memory 55 in substantially the same way as that described for the embodiment shown in FIG. 1A.

Another aspect of the present invention is a method. In one embodiment, the method uses a system similar to that described in FIG. 1A. It is to be understood that a variety of modifications of the embodiment shown in FIG. 1A also can be used to implement a variety of methods according to the present invention.

Figure 1C:
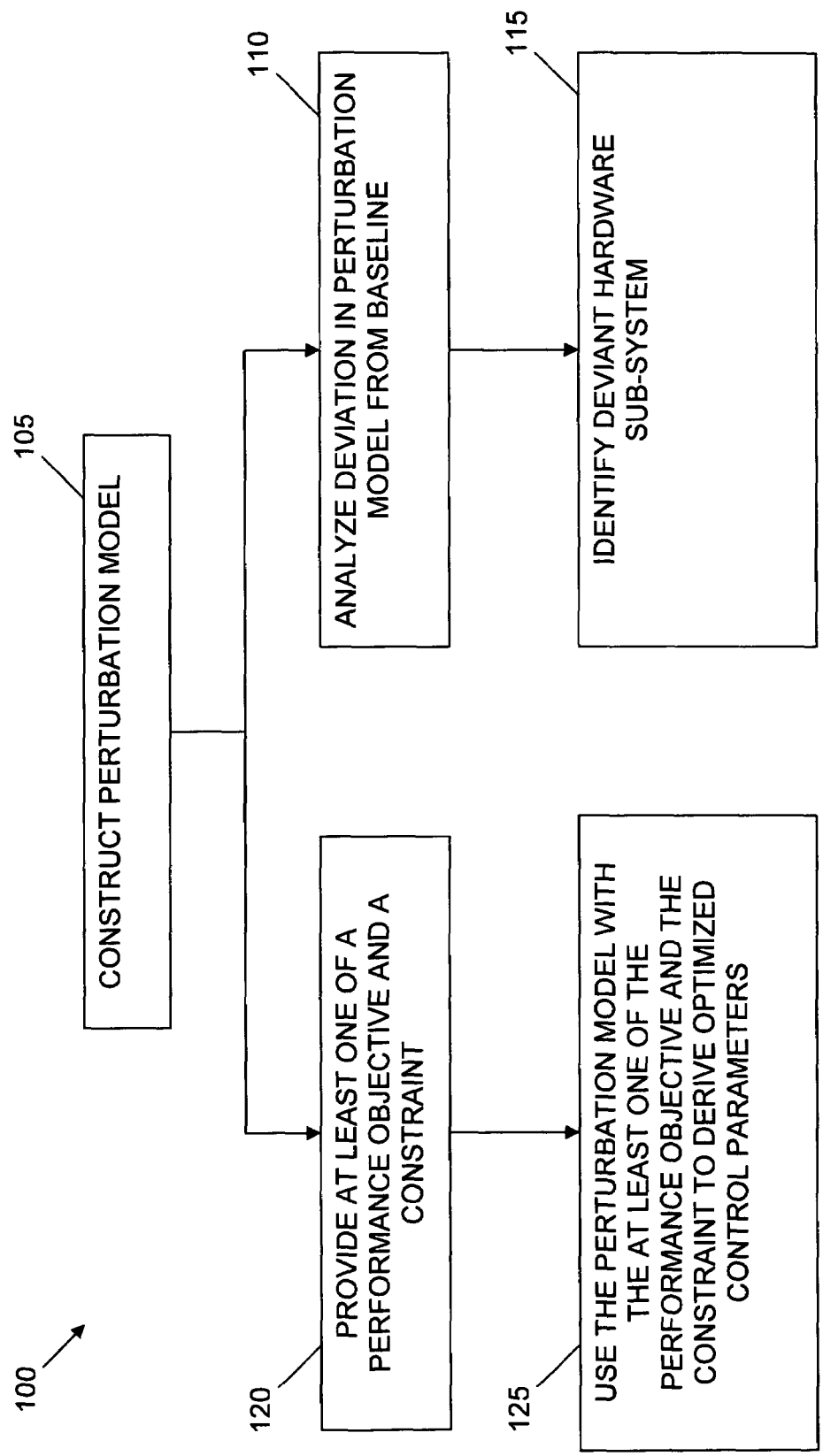
FIG. 1C. A flow diagram according to an embodiment of the present invention.

Reference is now made to FIG. 1C where there is shown an overview flow diagram of methods according to the present invention. The first step in the flow diagram is step 105 which includes construction of a perturbation model. Optionally, the perturbation model may be process chamber specific such as for a plasma processing tool, a chemical mechanical planarization tool, or an optical exposure tool for processing substrates. The perturbation model may be designed for that specific type of plasma reactor. Preferably, the model is derived experimentally by the collection of in-situ substrate-level data. The model is constructed using modeling methods such those described in U.S. Patent Application 60/469,377 filed 8 May 2003 and U.S. patent application Ser. No. 10/673,049 filed 26 Sep. 2003; the contents of all of these applications are incorporated herein by this reference. When applied to applications for complex processes such as plasma processes, the model also includes interaction terms to describe more fully the behavior of the process.

In a preferred embodiment, the perturbation model is constructed for a baseline process and process tool so that the performance of the process and process tool can be represented using the model. Preferred embodiments of the present invention model both temporal and spatial parameter responses for a process tool. In many situations, certain components of the process tool have a distinct spatial signature, i.e., an associated set of parameter characteristics. Preferably, responsivities are generated for the baseline process and process tool. After construction of the perturbation model 105, two options are available.

According to one embodiment of the present invention, one of the options is to use the perturbation model for applications such as monitoring the performance of the process and process tool and such as for fault detection and fault diagnosis. For such embodiments, the step following step 105 is step 110 which comprises the step of analyzing deviations between the baseline process perturbation model and a selected set of data such as experimental measurements and such as a perturbation model such as that for another process, or such as that for the same process run at a different time.

The next step is step 115 which includes identifying possible deviant hardware subsystems and such as process parameter deviations that cause the deviation between the baseline perturbation model and the selected set of data. A variety of methods can be used to identify the deviations. In one embodiment of the present invention, the perturbation models include both temporal and spatial responses for the substrates.

A second option following the step of constructing the perturbation model 105 is to use the baseline perturbation model for optimizing a process and process tool. This option includes step 120 which includes providing at least one of a performance objective and a constraint for the optimization. The model can be applied to optimize a parameter profile and/or process result to produce substantially any desired spatial shape. Examples of typical performance objectives include, but are not limited to, 1) minimizing total variation across a workpiece such as a semiconductor wafer, 2) introduction of a specific non-uniformity to achieve the desired results, and 3) producing final predetermined results for a workpiece. Following step 120 is step 125 which includes using the perturbation model with the at least one of the performance objective and the constraint to derive optimized control parameters, optimized process settings, and combinations thereof. Models for some applications of embodiments of the present invention might be too complex to be dealt with by linear optimization methods. For such application, embodiments of the present invention include non-linear iterative methods for building the model. Two examples of suitable non-linear iterative methods are local optimizers, such as the Levenberg-Marquardt method, and global optimizers, such as those using simulated annealing techniques.

Figure 2:
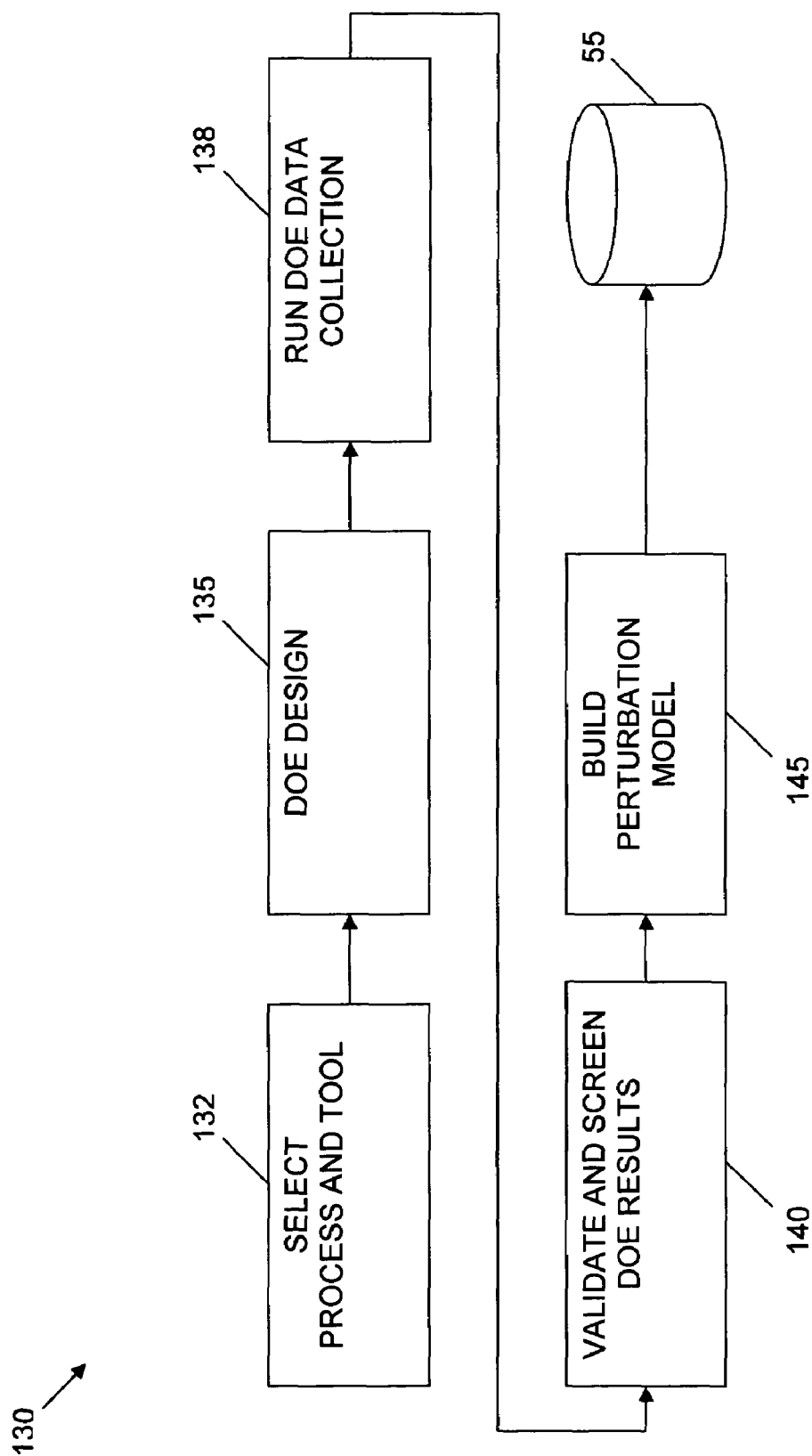
FIG. 2. A flow diagram according to an embodiment of the present invention.

Reference is now made to FIG. 2 where there is shown a flow diagram 130 for an embodiment of the present invention. Flow diagram 130 is directed towards a method for generating data to be incorporated into an information database stored on computer memory 55. The flow diagram showing in FIG. 2 is suitable for use with a system such as that described in FIG. 1A and FIG. 1B. Preferably, the information database already includes information such as process and process tool identification information, process recipes, and process tool hardware arrangement. The first step in flow diagram 130 is step 132 which includes selecting a process and process tool. Next is step 135 which involves preparing a design of experiments based on the selected process and process tool. The design of experiments is prepared so as to specify the experiments needed to collect sufficient data for characterizing the process and process tool. Following step 135 is step 138 which includes running the design of experiments to collect the design of experiments data. Since the perturbation model will be based on actual experimental results, preferred embodiments of the present invention include step 140 which involves performing a validation and screening of the design of experiments results. This means that the data collected for the design of experiments are tested to determine whether the selected parameters are significant in providing results representative of the process and process tool. As an option for some embodiments of the present invention, algorithms are included to generate confidence intervals for each point across the wafer so that they can then be used to assess the likelihood of any error being statistically significant. Parameters and data measurements that do not make a significant contribution, i.e., do not show the behavior of the process, are screened and not used for the perturbation model. After step 140 is step 145 which includes building the perturbation model based on data from the design of experiments that has been validated and screened.

The perturbation model is stored in memory 55 as part of the information database. As an option, data from the design of experiments and the parameter measurements for the DOE data collection may be stored in memory 55 as part of the database. In a preferred embodiment, responsivities derived from the perturbation model are stored as part of the database and memory 55.

The steps shown in FIG. 2 can be repeated so as to obtain a database of information for a variety of processes and process tools such as information for baseline or standard processes and process tools, information for preferred or optimum processes and process tools, and information for processes and process tools having known faults.

Figure 3:
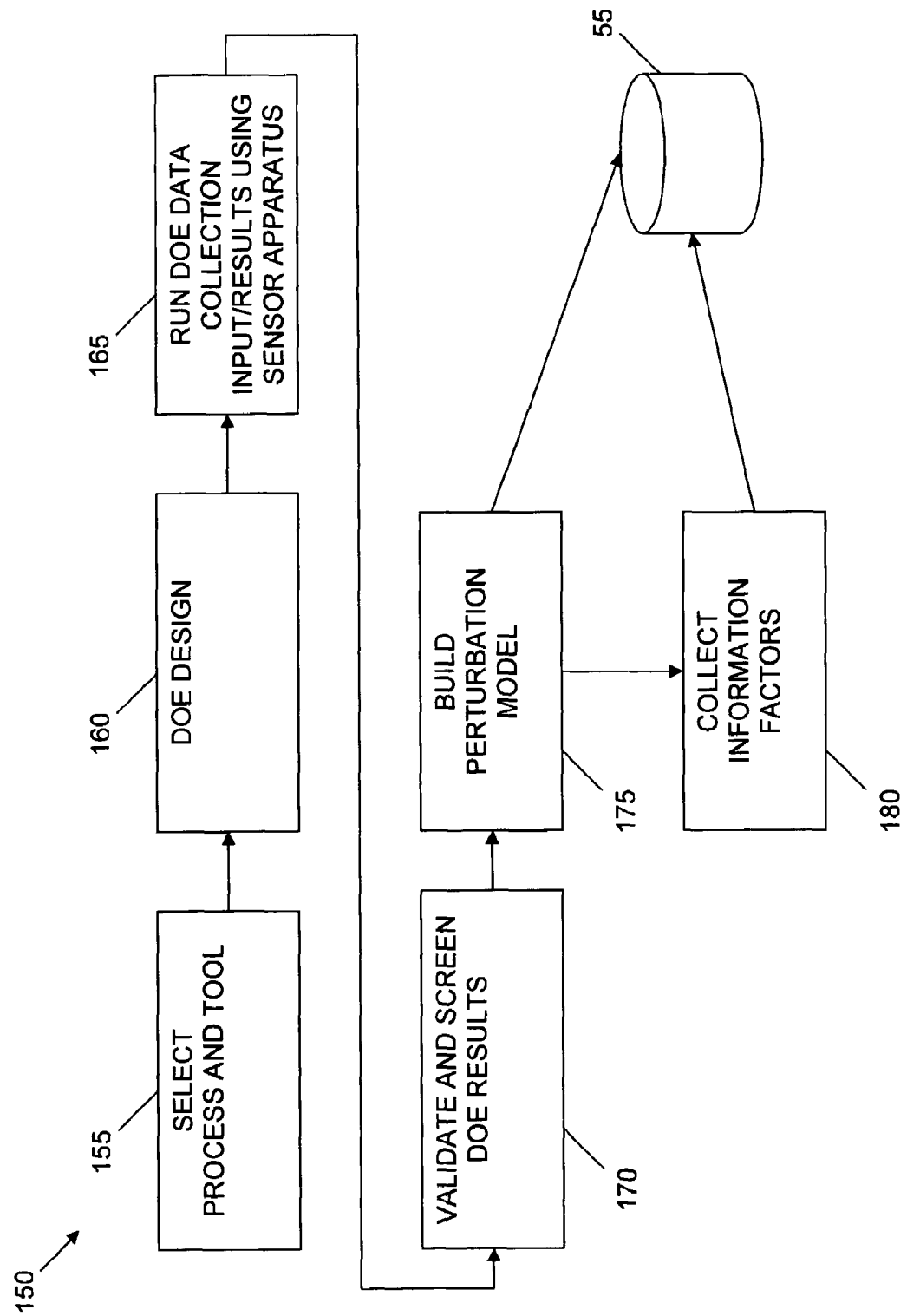
FIG. 3. A flow diagram according to an embodiment of the present invention.

Reference is now made to FIG. 3 where there is shown a flow diagram 150 for an embodiment of the present invention. The flow diagram showing in FIG. 3 is suitable for use with a system such as that described in FIG. 1A and FIG. 1B. Flow diagram 150 is directed towards a method for generating data to be incorporated into an information database stored on computer memory 55. Preferably, the information database already includes information such as process and process tool identification information, process recipes, and process tool hardware arrangement. The first step in flow diagram 150 is step 155 which includes selecting a process and process tool. Next is step 160 which involves preparing a design of experiments based on the selected process and process tool. The design of experiments is prepared so as to specify the experiments needed to collect sufficient data for characterizing the process and process tool. Following step 160 is step 165 which includes running the design of experiments to collect the design of experiments data. Preferred embodiments of the present invention include step 170 which involves performing a validation and screening of the design of experiments results. This means that the data collected for the design of experiments are tested to determine whether the selected parameters are significant in providing results representative of the process. Parameters and data measurements that do not make a significant contribution, i.e., do not show the behavior of the process, are screened and not used for the perturbation model. After step 170 is step 175 which includes building the perturbation model based on data from the design of experiments that have been validated and screened. The perturbation model is stored in memory 55 as part of the information database. As an option, data from the design of experiments and the parameter measurements for the DOE data collection may be stored in memory 55 as part of the database. In a preferred embodiment, responsivities derived from the perturbation model are stored as part of the database and memory 55.

Flow diagram 150 further includes step 180 which involves collecting information factors. For the embodiment shown in FIG. 3, the information factors are collected for the results obtained from the perturbation model. The information factors are saved in memory 55 as part of the information database. The use of information factors as part of process control and optimization methods have not been used until now. The information factors are, in preferred embodiments, numerical values assigned to provide a descriptive characterization of the process information such as process measurements, such as process results, and such as perturbation model responsivities. The information factors are selected so as to be used for comparing sets of data without using all of the data points; a comparison is made based on the information factors for the data. As an option for preferred embodiments of the present invention, information factors from step 180 are stored in memory 55 as part of the information database.

According to one embodiment of the present invention, information factors are determined with the empirical information stored about the data source. Information factors will incorporate both the spatial and magnitude aspects of the data source in question. This information is combined with statistical methods to simplify the information into statistically valid numbers to simplify human understanding and/or computer analysis. Example of this process is inputting of spatial thermal data as collected by a sensor device. The outer, edgemost sensor data is extracted in both magnitude and spatial uniformity. From the many options available, mean temperature and 3sigma values of these outer sensors are selected as the final two information factors.

Information factors for temporally varying process parameter measurements may include one or more information factors such as rate of change of the process parameter, range of the rate of change for the process parameter, the curvature of the change for the process parameter with respect to time, the slope of the parameter rate of change, the average steady-state value of the process parameter, and the range of the steady-state for the process parameter.

A more specific example can be seen for applications that involve temperature measurements as a function of time. For such applications, some examples of information factors are: average temperature rise rate, range of temperature rise rate, curvature of temperature rise rate, tilt of temperature rise rate, average steady-state temperature, and range of steady-state temperature.

Figure 4:
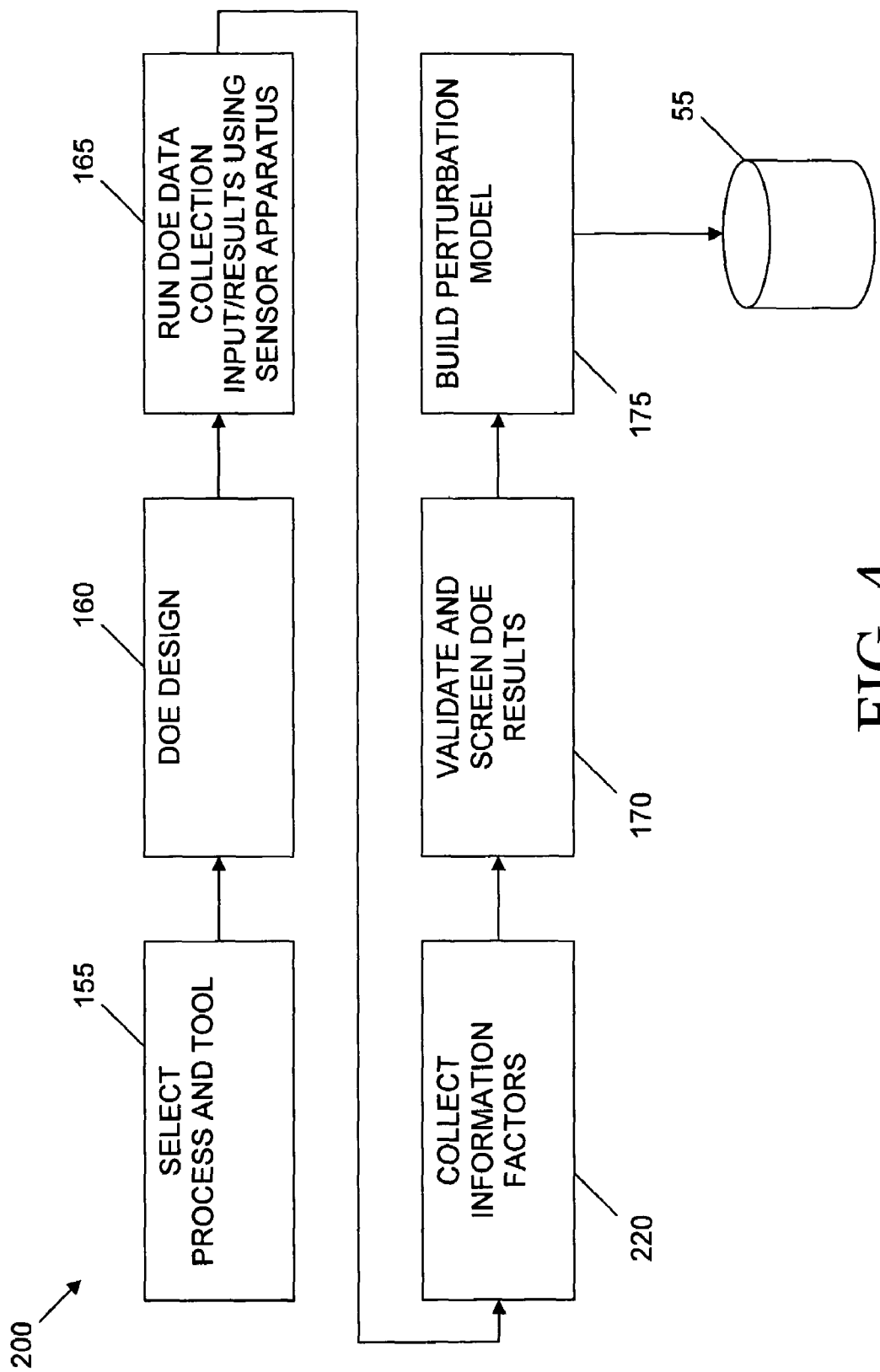
FIG. 4. A flow diagram according to an embodiment of the present invention.

Reference is now made to FIG. 4 where there is shown a flow diagram 200 for an embodiment of the present invention. The flow diagram shown in FIG. 4 is suitable for use with a system such as that described in FIG. 1A. Flow diagram 200 is directed towards a method for generating data to be incorporated into an information database stored on a computer memory 55. The embodiment shown in FIG. 4 is essentially the same as that described for the embodiment shown in FIG. 3. The embodiment shown in FIG. 4 includes step 155, step 160, step 165, step 170, and step 175 substantially as described for the embodiment shown in FIG. 3. The embodiment shown in FIG. 4 includes a step 220 that includes collecting information factors for the design of experiments data collected in step 165. FIG. 4 shows step 220 between step 165 and step 170. The information factors are validated and screened in step 170 rather than direct validation and screening of the data collected for the design of experiments results. The validated and screened information factors are then used to build the perturbation model in step 175. The perturbation model is stored in memory 55 as part of the information database. As an option, data from the design of experiments and the parameter measurements for the DOE data collection may be stored in memory 55 as part of the database. In a preferred embodiment, responsivities derived from the perturbation model are stored as part of the database in memory 55. The information factors are also stored in memory 55 for preferred embodiments of the present invention.

Figure 5:
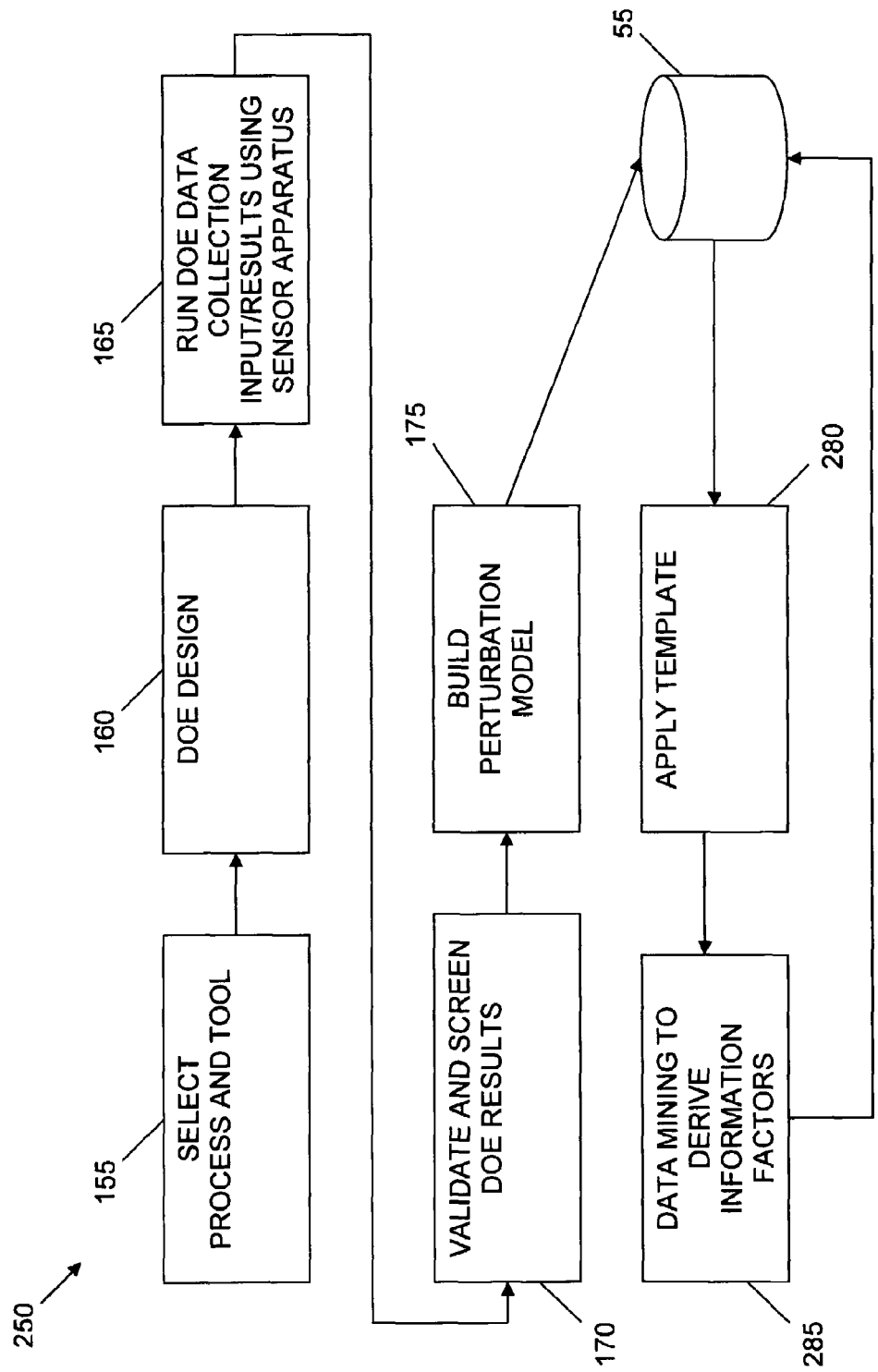
FIG. 5. A flow diagram according to an embodiment of the present invention.

Reference is now made to FIG. 5 where there is shown a flow diagram 250 for an embodiment of the present invention. The flow diagram shown in FIG. 5 is suitable for use with a system such as that described in FIG. 1A. Flow diagram 250 is directed towards a method for generating data to be incorporated into an information database stored on a computer memory 55. The embodiment shown in FIG. 5 is similar to that described for the embodiment shown in FIG. 4. The embodiment shown in FIG. 5 includes step 155, step 160, step 165, step 170, and step 175 substantially as described for the embodiment shown in FIG. 4. The embodiment shown in FIG. 5 includes a step 280 that includes applying a template to perturbation model data so as to allow automatic comparison of the perturbation model to a body of other perturbation models. Data mining can then be accomplished to determine relevant information factors for further analysis. Also shown is step 285 which includes performing data mining on data that are obtained in step 280 so as to obtain information factors. The information factors are stored in memory 55 as part of the information database.

Step 285 can be performed in a variety of ways. More specifically, the data mining occurring in step 285 may include steps arranged such as to extract information factors from process data collected from the design of experiments and such as to extract information factors from the perturbation model results. In other embodiments, the data mining steps may include extracting time-based plots of specified information factors for one or more sets of data stored in the database. For still other embodiments, the data mining steps may include the steps of: 1) comparing various process models on a variety of processing chambers, 2) trending of a particular process chamber over time, 3) historical review of process chamber data to determine if control limits require tightening.

Figure 6:
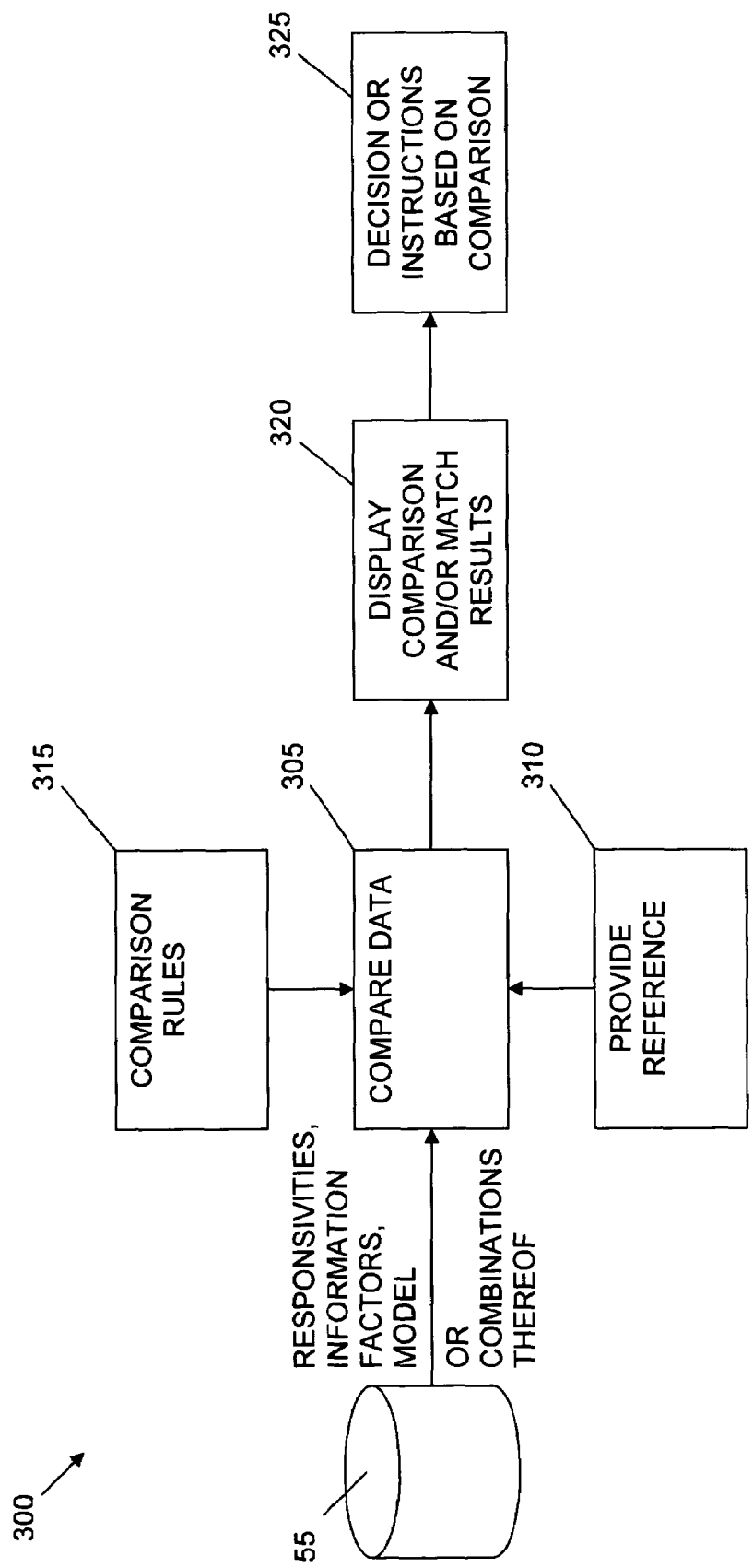
FIG. 6. A flow diagram according to an embodiment of the present invention.

Reference is now made to FIG. 6 where there is shown a flow diagram 300 for a method according to one embodiment of the present invention. The method shown in FIG. 6 is for use with a system such as the system described for FIG. 1A and FIG. 1B. Flow diagram 300 includes compare data step 305. Compare data step 305 involves using data from the information database stored in memory 55 along with data for a reference provided in step 310 and comparison rules provided from step 315. Optionally, the data from memory 55 may include one or more of information factors as described above, a combination of plain data and information factors, and a perturbation model. In one embodiment, compare data step 305 involves comparing data from the information database stored on memory 55 with data for the reference. The comparison is performed based on the comparison rules.

Generally, the comparison rules are a matter of designer choice based on the nature of the process, the process tool, and the application for which the method is being used. An example of comparison rules suitable for some embodiments of present invention are differences in values as represented by subtraction operations. Another example of comparison rules are differences as represented by ratios as represented by division operations. The comparison rules may include ranges for the accepted differences. In other words, the rules may include specifications of items such as how great a difference constitutes a deviation that is substantial.

As an example, the processing of a semiconductor wafer in a plasma tool that includes an electrostatic chuck for controlling the wafer temperature with a backside flow of helium, the normal Helium Back Side Cooling (He BSC) effects are concentric. This means that it produces concentric maps for measurements such as temperature of the wafer. If there is a significant shift in the parameter profile, for example, if the He BSC shows a tilted effect across the wafer, the method identifies that there is something wrong with the He BSC. An embodiment of the present invention for this application includes an algorithm for subtracting and/or dividing the data for an observed model from the baseline model.

The results of step 305 are provided as output to step 320 which includes displaying comparison and/or match results. Step 320 gives access to the results of the comparison to a user of the method, preferably in a graphical display. Of course, step 320 is not a required step but is preferred for some embodiments of the present invention. Flow diagram 300 further includes step 325 which involves providing a decision or instructions based on the comparison. Generally, the decision or instructions are predetermined for the particular application; different decisions or instructions are indicated as specified by the designer.

Flow diagram 300 shows step 310 as providing reference data for processing in step 305. Optionally, the step of providing the reference data may include retrieving data from the information database stored in memory 55. In other words, the comparison of data may be made using data from the database in memory 55. For some embodiments of the present invention, retrieving the data from memory 55 is preferred. As another option, the step of providing comparison rules, step 315, may include retrieving the comparison rules from the information database stored in memory 55 rather than having a separate input of comparison rules from another source.

Embodiments of the present invention that include the flow diagram shown in FIG. 6 are preferably arranged for monitoring the performance of a process such as for determining whether there is an error or malfunction for a process and such as for determining whether a new process meets predetermined production specifications.

Figure 7:
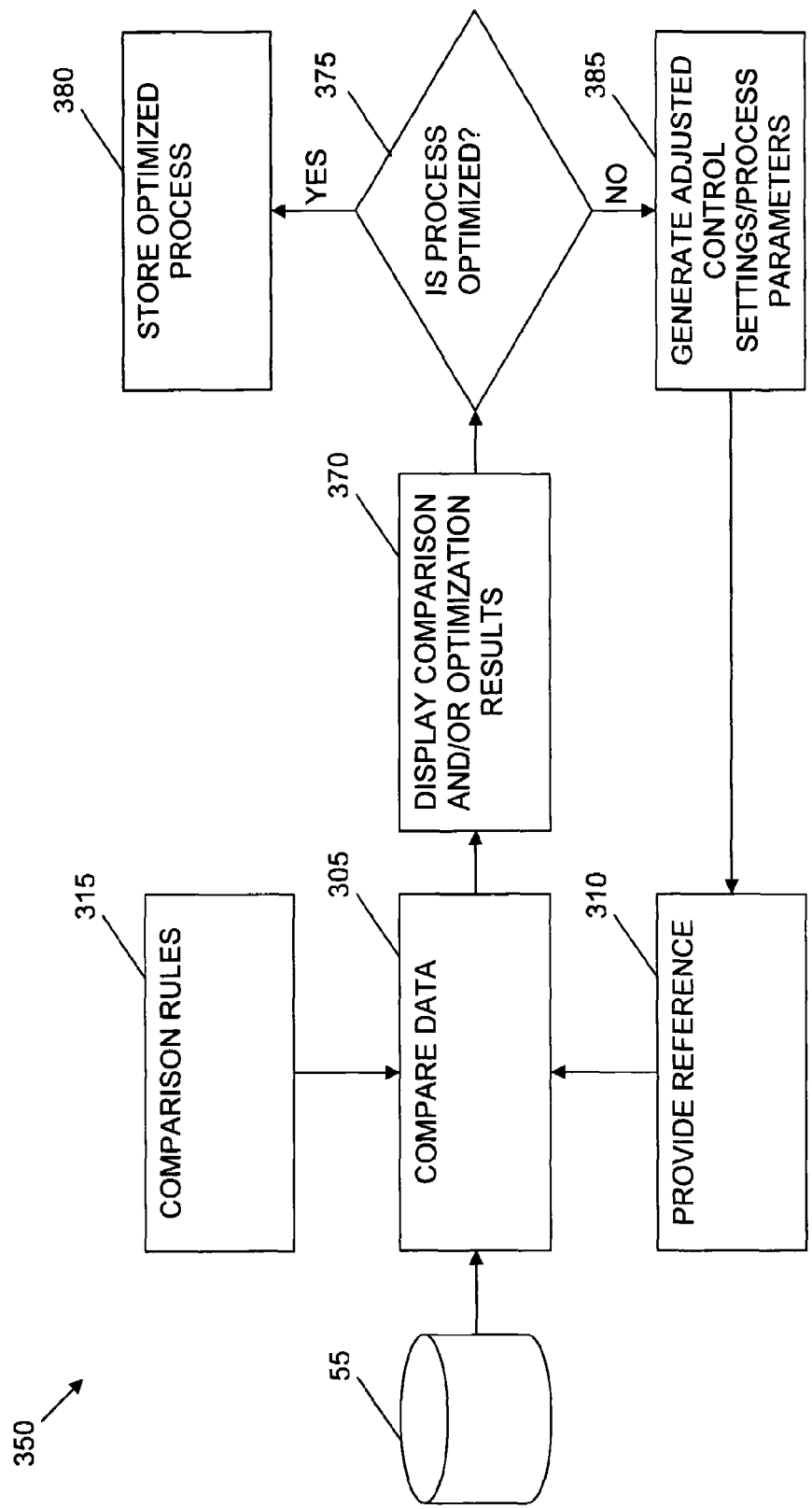
FIG. 7. A flow diagram according to an embodiment of the present invention.

Reference is now made to FIG. 7 where there is shown a flow diagram 350 for a method according to one embodiment of the present invention. The method shown in FIG. 7 is for use with a system such as the system described for FIG. 1A and FIG. 1B. Flow diagram 350 includes compare data step 305. Compare data step 305 involves using data from the information database stored in memory 55 along with data for a reference provided in step 310 and comparison rules provided from step 315. Optionally, the data from information database 55 includes information factors as described above, plain data and information factors, the perturbation model, responsivities obtained for the perturbation model, or combinations thereof. In one embodiment, the compare data step involves comparing data from the information database stored on memory 55 with data for the reference. The comparison is performed based on the comparison rules. Optionally, the comparison rules are substantially the same as those described for the embodiment shown in FIG. 6.

The results of step 305 are provided as output to step 370 which includes displaying comparison and/or optimization results. Step 370 gives a user of the method access to the results of the comparison, preferably in a graphical display. Of course, step 370 is not a required step but is preferred for some embodiments of the present invention. Flow diagram 350 further includes step 375 which involves making a decision as to whether the comparison performed in step 305 meets the requirements for having an optimized process. The requirements for having an optimized process are a matter of designer choice. If the requirements for optimization are met then the next step is step 380 which involves storing the optimized process in the information database stored on memory 55.

If the requirements for optimization are not met then the next step is step 385.

Step 385 involves generating adjustments to control settings and/or process parameters according to a predetermined optimization algorithm. For preferred embodiments of the present invention, the optimization is done based on at least one of a performance objective and a constraint. Data are collected using the adjusted control settings and/or process parameters. The data collected for the adjusted settings are then provided as the reference data of step 310 which is provided to compare data step 305. The process is repeated so as to find an optimized process.

Figure 8:
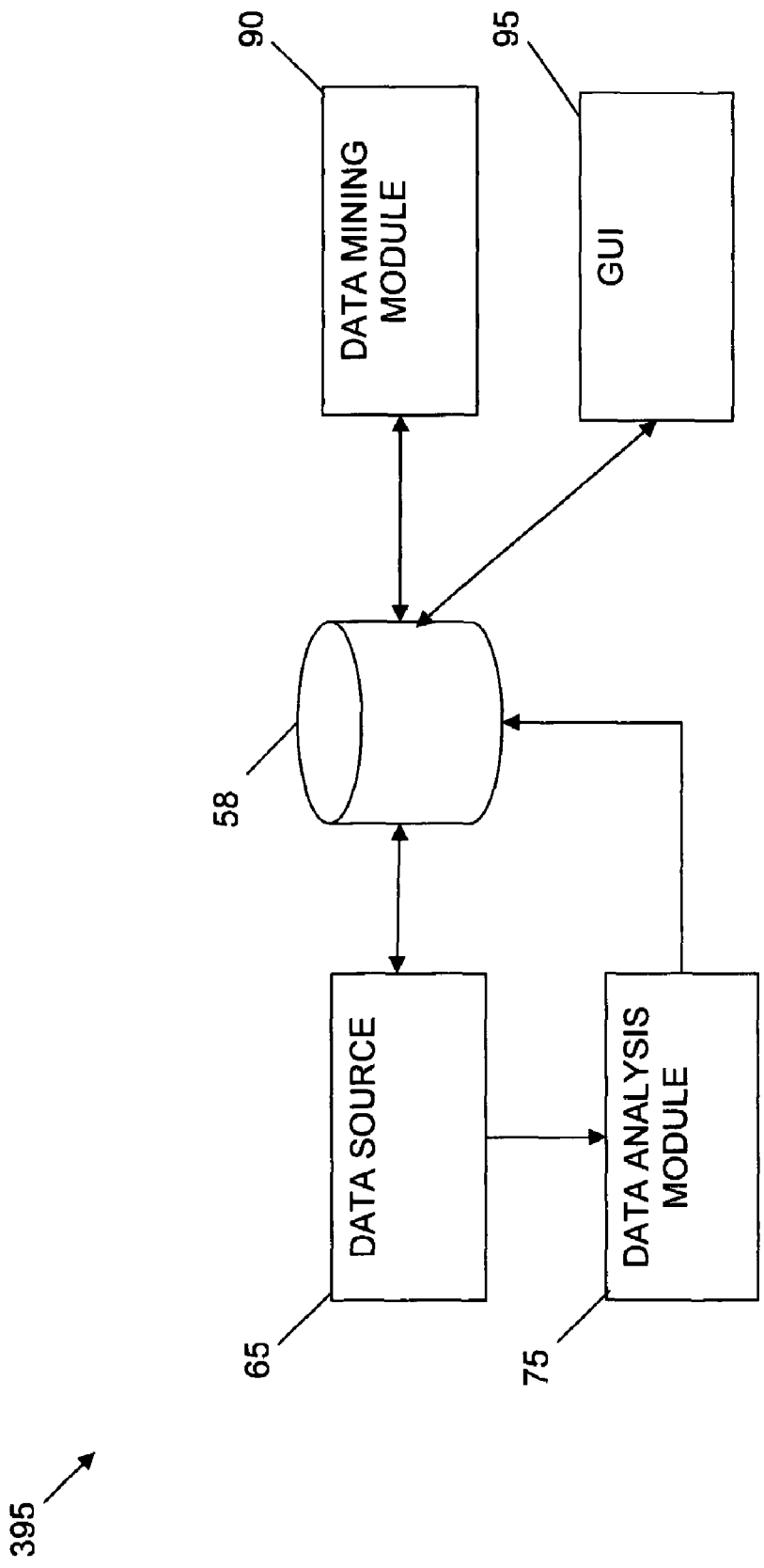
FIG. 8. A block diagram of a system according to an embodiment the present invention.

Reference is now made to FIG. 8 where there is shown a block diagram of a system 395 according to another embodiment of the present invention. System 395 is configured for at least one of process monitoring, process optimization, fault detection, and fault identification for one or more process tools and processes used for processing a workpiece. System 395, as shown in FIG. 8, represents a preferred embodiment of the present invention. It is to be understood that all of the components shown in FIG. 1A are not necessary for other embodiments of the present invention.

System 395 includes a memory 58 such as a computer information storage memory capable of storing information in a data structure such as an information database for preferred embodiments of the present invention. Is to be understood that embodiments of the present invention are not limited to the use of an information database. Optionally, the information can be stored in data structures such as one or more lists, arrays, tables, relational databases, hierarchical databases, and other data structures known to a person of ordinary skill in the art. System 395 also includes a data source 65, a data analysis module 75, and display graphical user interface 95, all substantially as described for the embodiment shown in FIG. 1A. For the embodiment shown in FIG. 8, memory 58 is connected with data source 65 for data transfer. Data source 65 is connected with data analysis module 75 so as to provide data to data analysis module 75. Data analysis module 75 is connected with memory 58 for storing data in memory 58.

As described above, data source 65 provides process data such as spatially resolved and temporally resolved process parameter measurements collected during process conditions used for processing a workpiece. Data analysis module 75 is configured so as to be capable of performing functions such as validation and screening process data. Data analysis module 75 is also configured for extracting information factors for sets of process data.

FIG. 8 also shows a data mining module 90 connected with memory 58 so as to have access to the database. Memory 58 includes a body of data from data source 65 and data analysis module 75 that may include data accumulated for a plurality of tools, a plurality of processes, or both. As another option, the body of data may include information collected over a period of time for applications such as applications showing trends, statistical process control, and historical tool performance. Alternatively, the body of data may include data for preferred processes or what may be referred to in the industry as "Golden" processes. The body of data may include data for known failures so as to provide characterizations of the failure for fault identification and diagnosis. In a preferred embodiment, the body of data comprises spatially resolved and temporally resolved process data measurements: this means data for two spatial dimensions and time. In a more preferred embodiment, the body of data is represented in the form of information factors based on spatially resolved and temporally resolved process data measurements. In addition to the process data from data source 65 and data analysis module 75, memory 58 also includes information related to the process data such as process recipes and process tool configurations.

Data mining module 90 is configured for deriving correlations for one or more of: process tool configuration, process recipes, process conditions, process data measurements, process results, and information factors so as to provide at least one of process optimization, process control, fault detection, and fault diagnosis. The correlations made by data mining module 90 are performed in response to data targets provided by a user. The data targets are the instructions and performance standards for the data mining; they include instructions such as what sets of data are to be mined, what information is to be obtained by the data mining, and rules for the correlations.

For one embodiment of the present invention, data mining module 90 is configured so as to obtain a time-based plot of specified information factors for one or more sets of data. In another embodiment of the present invention, data mining module 90 is configured so as to derive a statistical process control chart for specified information factors for a specified process tool. Optionally, the statistical process control chart derivation may be made using Western Electric Rules. In another embodiment of the present invention, data mining module 90 is configured so as to compare one or more sets of data with data for a specified standard process and standard process tool configuration so as to identify whether the one or more sets of data match the results for the specified standard. In another embodiment of the present invention, data mining module 90 is configured so as to compare one or more sets of data with data for a specified standard process and standard process tool configuration so as to identify whether the one or more sets of data match the results for the specified standard.

The embodiment further includes having data mining module 90 issue instructions such as "go" or "no go" in response to the data mining results. In still another embodiment of the present invention, data mining module 90 is configured to diagnose a fault by comparing one or more sets of data with a set of data associated with a process tool that has a hardware failure or with a process that has an incorrect setting. In other words, the process tool may have a hardware failure or the process may have an incorrect process setting.

Reference is now made to FIG. 9 where there is shown a flow diagram 400 according to an embodiment of the present invention for the system shown in FIG. 8. Flow diagram 400 shows computer memory 58 containing information that includes information factors for a body of process data. The first step in flow diagram 400 is step 405, perform data mining on data from computer memory 58. The data from memory 58 includes information factors. Preferably, the data mining function is performed using the information factors. Step 405 is performed according to data targets provided from step 410. Flow diagram 400 includes step 415, the step of displaying the data mining results. It is to be understood that step 415 is an optional step and is not required for embodiments of the present invention. Flow diagram 400 also shows that the results of the data mining are stored in memory 58.

A preferred embodiment of the present invention comprises a perturbation model. As a part of building a model, critical process variables are selected for a process tool. A series of designed experiments is constructed and programmed into a process recipe for the process tool. A sensor apparatus, as described above, is run through the process tool and processed with the recipes from the designed experiments so as to collect parameter measurements. The parameter measurements are used in building a perturbation model. Preferably, sufficient data are collected so as to provide spatial resolution, temporal resolution, or both for the process data so as to obtain a component level representation of the process performance.

Systems according to embodiments of the present invention, such as those described in FIG. 1A and FIG. 1B, can be used with a variety of methods according to embodiments of the present invention. One embodiment of the present invention comprises a method of determining the performance of a process tool for a selected process for processing a workpiece. The method comprises the step of producing a perturbation model for the operation of the process tool. The perturbation model is produced by selecting input parameters for the process, selecting perturbations for the parameters for the characterization process, and executing a design of experiments for generating process parameter measurements related to input parameter perturbations for the process. The method further includes the step of validating the process parameter measurements and the designed experiments information so as to identify validated parameters. In one embodiment, the step of validating the process parameter measurements includes providing at least one significance criteria for the input parameters for the process and testing the significance of the input parameters for the characterization process using the process parameter measurements and the input parameters for the process to determine if the at least one significance criteria is met. The method includes the step of building the perturbation model using the validated parameters so as to provide a perturbation model representing the performance of the process and process tool. In preferred embodiments, the perturbation model is configured so as to provide responsivities.

Using the perturbation model, the performance of the process tool is evaluated by collecting reference data on the process tool and comparing it to the results obtained from the perturbation model. The reference data may be derived from periodic checks of the process tool performance wherein data are collected for predetermined test conditions. Alternatively, the reference data may comprise measurements made as part of a procedure such as a fault detection procedure, an optimization procedure, and a chamber matching procedure. In preferred embodiments, the performance is evaluated using responsivities obtained from the perturbation model and includes comparing the responsivities to the reference data. More specifically, the comparison includes the steps of evaluating deviations between the perturbation model responsivities and the reference data.

In a preferred embodiment, the method includes the step of providing at least one performance criteria for evaluating the deviation and the significance of the deviation. The method further includes the step of determining the deviation between the perturbation model responsivities and the reference data so as to determine whether the at least one performance criteria for the process tool is met.

Preferred embodiments of the present invention use the responsivities from the perturbation model in the form of information factors and use the reference data in the form of information factors for making the comparisons. This means that the method, as an option, includes the steps of identifying at least one information factor that provides a descriptive characterization of the process results data for the reference to and for the perturbation model. The method further includes deriving at least one information factor for the reference data and deriving at least one information factor for responsivities. The step of determining the deviation includes determining the deviation between the at least one information factor for the reference data and the at least one information factor for the responsivities.

For some embodiments of the present invention, the process results data comprises a process measurement as a function of time. Methods according to such embodiments include the steps of identifying at least one information factor that provides a descriptive characterization of the process results data for the reference data and the responsivities. Examples of the at least one information factor maybe one or more of an average rate of change for the process measurement, a range of process measurement change at a predetermined time, a curvature of process measurement change at a predetermined time, tilt of process measurement change at a predetermined time, average steady-state value of the process measurement at a predetermined time, and the range of steady-state value of the process measurement at a predetermined time. This list is only provided as an illustration of possible information factors; suitable information factors are not limited to the items in the list.

For embodiments of the present invention that include temperature measurements as a function of time, methods according to the present invention preferably included using information factors selected for temperature measurements. For such embodiments, examples of suitable information factors, include but are not limited to, average rate of temperature rise, range of temperature rise at a predetermined time, curvature of temperature rise at a predetermined time, tilt of temperature rise at a predetermined time, average steady-state temperature rise at a predetermined time, and the range of steady-state temperature rise at a predetermined time.

As an option for some embodiments of the present invention, the reference data may be presented as responsivities derived from a perturbation model of the reference process. Alternatively, the reference data may include parameter measurements obtained from executing a design of experiments for the reference process. As an option, a perturbation model can be prepared for the reference process using essentially the same procedure described above.

Another benefit of embodiments of the present invention is that the perturbation model is portable. In other words, the model is good across apparatus, such as heating apparatus, of the same type that are operated under similar conditions such as temperature, airflow etc. This means that embodiments of the present invention can include calibrating or optimizing heating apparatuses of the same type, operating under similar conditions, without reconstructing the perturbation model. Chamber matching to the component level can be ascertained with this data. Typical portable models are centered on simple, inert chemistry chamber start-up conditions. Process-specific models can also be developed for demanding for complex processes such as etch applications.

The parameter data for preferred embodiments of the present invention are collected using a sensor apparatus as described supra. For one embodiment of the present invention, the parameter data are thermal profiles across the substrate surface for plasma processing. Other embodiments of the present invention include other parameter data such as plasma density, plasma chemistry makeup, and ion density.

In other embodiments of the present invention, constraints other than those presented supra can be imposed for the optimization step. For instance, a constraint such as confining the magnitude of the changes of the control variables can be used. Alternatively, a constraint that includes constraining the temperature profiles to have zero overshoot can be used. Still other constraints may include matching of a specific responsivity profile, or adjustment to the temporal trajectory of data from the data source.

Other embodiments of the present invention can use a variety of optimization algorithms. For some embodiments, the optimization problem reduces to a least squares calculation, but more generally, nonlinear programming may be included for the optimization steps for some embodiments of the present invention.

Some embodiments of the present invention may include optimization criteria comprising various competing optimization objectives. For example, an embodiment of the present invention may include the optimization objectives of minimizing the temperature spread in both the transient and the near steady-state regimes by using-a weighted combination of all the optimization objectives.

Furthermore, while plasma processing is used as an example, other embodiments of the present invention include other processes such as photolithography processes, chemical-mechanical planarization processes, wet processes, e-beam processes, mask making processes, flat-panel display processes, deposition processes, annealing processes, curing processes, and other processes for processing workpieces such as semiconductor wafers, flat panel display substrates, and lithography mask substrates. For these types of processes, embodiments of the present invention can be used to define templates, extract information factors, and extract perturbation model responsivity maps for statistical process control, process optimization, and process tool diagnostics.

While a preferred embodiment of the present invention has been used to manipulate temperature profiles, it is to be understood that embodiments of the present invention are not to be limited to temperature profiles. In view of the teachings presented in the present application, it would be clear to one of ordinary skill in the art that an extension of the techniques taught herein result in additional embodiments of the present invention that incorporate the manipulation of other types of variables, or even the combination of many different variables. An embodiment of the present invention for processing a substrate with a glow discharge plasma includes using methods presented supra to also measure parameters such as plasma potential, ion energy, ion density, heat flux, etc. All of these parameters could be monitored and recorded as a function of position and time, and all of them, separately or in combination, can be regulated using the methods described herein.

The preferred embodiment of the present invention uses autonomous wireless metrology. However, methods according to the present invention will keep most of its advantages even if used with data collected by wired, in-situ sensors, such as those that are necessary in high temperature operations such as rapid thermal processing, chemical vapor deposition, plasma enhanced chemical vapor deposition, and others.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A system for operation of processes and process tools for processing workpieces, the system comprising;
    a computer memory for storing information;
    a design of experiments module configured for generating a design of experiments for characterizing the processes and process tools, wherein the design of experiments specifies experiments needed to collect sufficient data for characterizing a process and process tool, the design of experiments module being connected with the memory for retrieving information for preparing the design of experiments and for storing the design of experiments in the memory;
    a data source for providing process data for the design of experiments, the data source being configured for storing and retrieving data in the memory, an information processor connected with one or more sensors for receiving signals from the sensors, the information processor being configured for data communication with the memory, the sensor apparatus being configured for measuring process parameters substantially equivalent to those experienced by the workpieces;
    a data analysis module for validating and screening the process data, the data analysis module being connected with the memory so as to store and retrieve information; and
    a perturbation model builder for providing a perturbation model representing the performance of the processes and process tools, the perturbation model builder being configured for retrieving information from the memory for building the model, and
    storing the perturbation model.

2. The system of claim 1 further comprising a comparison module configured for comparing data stored in the memory.

3. The system of claim 1 wherein the perturbation model is configured for generating responsivities, the responsivities are stored in the memory, and further comprising a comparison module configured for comparing responsivities stored in the database so as to identify whether the processes and process tools are operating within predetermined specifications.

4. The system of claim 1 further comprising a comparison module configured for comparing information stored in the database so as to identify a fault for at least one of:
    the processes or the process tools.

5. The system of claim 1 wherein the perturbation model is configured for generating responsivities, the responsivities are stored in the memory, and further comprising a comparison module configured for comparing information stored in the database so as to identify a fault for at least one of:
    the processes or the process tools.

6. The system of claim 1 further comprising an optimization module configured for adjusting at least one control parameter for at least one of the processes and the process tools as a function of predetermined optimization criteria and comparisons of information in the memory.

7. The system of claim 1 wherein the perturbation model is configured for generating responsivities, the responsivities are stored in the memory, and further comprising an optimization module configured for adjusting at least one control parameter for at least one of the processes and the process tools as a function of predetermined optimization criteria and comparisons of information in the memory.

8. The system of claim 1 further comprising a graphical user interface for displaying information in the database.

9. The system of claim 1 wherein the memory is connected with a computer or a computer network for executing computer programs and the design of experiments module comprises a computer program executed on the computer or computer network, the data analysis module comprises a computer program executed on the computer or computer network, the perturbation model builder comprises a computer program executed on the computer or computer network.

10. The system of claim 1 wherein the process tools are configured for processing lithography mask substrates, flat-panel display substrates, or printed circuit board substrates.

11. The system of claim 1 wherein the processes comprise processes used for processing semiconductor wafers.

12. The system of claim 1 wherein the processes are selected from the group consisting of deposition, etching, planarization, thermal annealing, lithography wet processing, and polishing.

13. The system of claim 1 wherein the data source provides at least one of spatially resolved process data and temporally resolved process data.

14. The system of claim 1 wherein the data source comprises the memory.

15. The system of claim 1 wherein the memory contains an information database that includes information factors for process parameter measurements.

16. The system of claim 1 wherein the memory contains an information database that includes responsivities.

17. The system of claim 1 wherein the memory contains an information database that includes information factors and responsivities.

18. The system of claim 1 wherein the design of experiments provides a process setting for operating a selected process tool.

19. The system of claim 1 wherein the data source comprises a substantially autonomous sensor apparatus comprising a base and a plurality of sensors supported by the base.

20. The system of claim 19 wherein the base is configured to mimic the workpieces by virtue of being made of the same or similar materials as the workpieces and/or having approximately the same dimensions as those of the workpieces.

21. The system of claim 1 wherein the data analysis module is configured to screen and validate the design of experiments.

* * * * *

UNITED STATES PATENT AND TRADEMARK OFFICE
CERTIFICATE OF CORRECTION

PATENT NO.        : 7,580,767 B2
APPLICATION NO.   : 11/179440
DATED             : August 25, 2009
INVENTOR(S)       : MacDonald et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Fourteenth Day of December, 2010

David J. Kappos
*Director of the United States Patent and Trademark Office*